(12) United States Patent
Lai

(10) Patent No.: US 7,264,581 B1
(45) Date of Patent: Sep. 4, 2007

(54) MACHINING CENTER WITH A RELAY TOOL EXCHANGE DEVICE

(75) Inventor: Jim Lai, Taichung Hsien (TW)

(73) Assignee: Ding Koan Machinery Co., Ltd, Fongyuan (TW)

( * ) Notice: Subject to any disclaimer, the term of this patent is extended or adjusted under 35 U.S.C. 154(b) by 0 days.

(21) Appl. No.: 11/650,901

(22) Filed: Jan. 8, 2007

(51) Int. Cl.
*B23Q 3/157* (2006.01)
*B23C 1/00* (2006.01)

(52) U.S. Cl. ............ 483/40; 483/41; 483/48; 483/52; 483/49; 409/212

(58) Field of Classification Search ............ 483/38–42, 483/44–46, 48–49, 51–53; 409/202, 212
See application file for complete search history.

(56) References Cited

U.S. PATENT DOCUMENTS

| | | | |
|---|---|---|---|
| RE31,288 E * | 6/1983 | Matsuzaki et al. ............ | 483/44 |
| 4,635,342 A * | 1/1987 | Balding ......................... | 483/7 |
| 4,987,668 A * | 1/1991 | Roesch ......................... | 483/30 |
| 5,062,195 A * | 11/1991 | Binder ......................... | 483/15 |
| 5,093,978 A * | 3/1992 | Binder ......................... | 483/43 |
| 5,107,581 A * | 4/1992 | Reuter et al. .................. | 483/61 |
| 5,131,136 A * | 7/1992 | Uchida et al. .................. | 483/5 |
| 5,314,397 A * | 5/1994 | Mills et al. .................... | 483/30 |
| 5,342,276 A * | 8/1994 | Fujiwara et al. .............. | 483/29 |
| 5,823,722 A * | 10/1998 | Takenaka ..................... | 409/230 |
| 6,066,078 A * | 5/2000 | Koelblin et al. .............. | 483/55 |
| 6,416,450 B2 * | 7/2002 | Susnjara ....................... | 483/47 |
| 6,514,183 B2 * | 2/2003 | Hoppe .......................... | 483/46 |
| 7,192,225 B2 * | 3/2007 | Takayama et al. .......... | 409/212 |
| 2003/0073553 A1 * | 4/2003 | Endo et al. .................... | 483/30 |
| 2006/0291971 A1 * | 12/2006 | Tanoue et al. .............. | 409/202 |

FOREIGN PATENT DOCUMENTS

| | | |
|---|---|---|
| DE | 3440604 A1 * | 5/1986 |
| JP | 54-005278 A * | 1/1979 |
| JP | 58-077425 A * | 5/1983 |
| JP | 58-223543 A * | 12/1983 |
| SU | 1558629 A1 * | 4/1990 |

* cited by examiner

*Primary Examiner*—Erica Cadugan
(74) *Attorney, Agent, or Firm*—Alan Kamrath; Kamrath & Associates PA

(57) ABSTRACT

A machining center includes a first column, a second column, a crossbeam mounted transversely on the first and the second columns, a tool magazine, an upper tool exchange device mounted on the crossbeam, a lower tool exchange device mounted on the tool magazine and a relay tool exchange device. The tool magazine is mounted near the first column and extends transversely. The relay tool exchange device is mounted on the first column and has a guide device, a frame, a tool case and a driving device. The guide device is mounted on the first column and extends longitudinally. The frame is mounted moveably on the guide device. The tool case is mounted the frame and aligned selectively with the upper and the lower tool exchange devices. The driving device is connected to the frame and drives the frame to approach the upper and the lower tool exchange devices.

13 Claims, 10 Drawing Sheets

MACHINING CENTER WITH A RELAY TOOL EXCHANGE DEVICE

BACKGROUND OF THE INVENTION

1. Field of Invention

The present invention relates to a machining center, and more particularly to a machining center with a relay tool exchange device.

2. Description of the Related Art

With reference to FIG. 10, a conventional machining center comprises a table (50'), two columns (51'), a crossbeam (52'), a spindle (53'), a tool magazine (60') and a tool exchange device (54'). The table (50') has two transverse sides. The columns (51') are mounted respectively near the transverse sides of the table (50'). The crossbeam (51') is mounted transversely on the columns (51'), is moveable relative to the table (50') along the columns (51') and has a tool end. The spindle (53') is mounted on the crossbeam (52'), is moveable transversely along the crossbeam (52') and has a spindle head and a machining tool. The machining tool is mounted detachably on the spindle head. The tool magazine (60') is mounted near one of the columns (52') and the tool end of the crossbeam (52'). The tool exchange device (54') is mounted on the tool end of the crossbeam (52').

When a machining process is completed and the machining tool of the spindle (52') is changed, the spindle moves to the tool end of the crossbeam (52') and the tool exchange device (54') detaches the tool from the spindle (53'). Then the crossbeam (52') moves down to dispose the tool exchange device (54') adjacent to the tool magazine (60') and the tool exchange device (54') grips a new tool for a next machining process from the tool magazine (60'). After the new tool is gripped, the tool exchange device (54') rotates 180 degrees and inserts the used machining tool into the tool magazine (60') and mounts the new tool on the spindle head of the spindle (53'). Finally, the tool exchange device (54') rotates to disengage from the spindle (53'), and the crossbeam (52') moves up to perform the next machining process.

The conventional machining center as described has the following disadvantage:

1. When the machining tool on the spindle (53') is changed, the crossbeam (52') needs to move up and down and the travel is quite long and usually causes a large position error. Hence the conventional machining center with a high precision is hardly manufactured.

2. Because the position of the tool magazine (60') is fixed, the crossbeam (52') must move down to a predetermined position to change tools. Therefore, size of workpieces that can be machined by the conventional machining center is limited.

3. When the machining tool on the spindle (60') is changed, the crossbeam (52') must move down to the predetermined position. So the conventional machining center takes a long time to change tools and machining efficiency of the conventional machining center is low.

4. Because the tool magazine (60') extends in a longitudinal direction, the size of the tool magazine (60') and number of tools received in the tool magazine (60') is limited. When some special machining processes are performed, some tools in the tool magazine need to be changed manually, and this increases time consumption.

To overcome the shortcomings, the present invention provides a machining center with a relay tool exchange device to mitigate or obviate the aforementioned problems.

SUMMARY OF THE INVENTION

The primary objective of the present invention is to provide a machining center with a relay tool exchange device that can improve manufacturing efficiency.

A machining center with a relay tool exchange device in accordance with the present invention comprises a first column, a second column, a crossbeam, a tool magazine, an upper tool exchange device, a lower tool exchange device and a relay tool exchange device. The first column extends longitudinally and has a longitudinal side surface and a transverse side surface. The second column extends longitudinally and is spaced from the first column. The crossbeam is mounted transversely on the first and the second columns and has a tool end near the first column. The tool magazine is mounted near the first column, extends transversely and has an inner transverse side surface. The upper tool exchange device is mounted on the tool end of the crossbeam. The lower tool exchange device is mounted on the inner transverse side surface of the tool magazine and is aligned with the upper tool exchange device. The relay tool exchange device is mounted on the transverse side surface of the first column and comprises a guide device, a frame, a tool case and a driving device. The guide device is mounted on the transverse side surface of the first column and extends longitudinally. The frame is mounted moveably on the guide device. The tool case is mounted the frame and aligned with the upper and the lower tool exchange devices. The driving device is connected to the frame and drives the frame up and down to approach the upper and the lower tool exchange devices.

Other objectives, advantages and novel features of the invention will become more apparent from the following detailed description when taken in conjunction with the accompanying drawings.

DETAILED DESCRIPTION OF THE INVENTION

Figure 1:
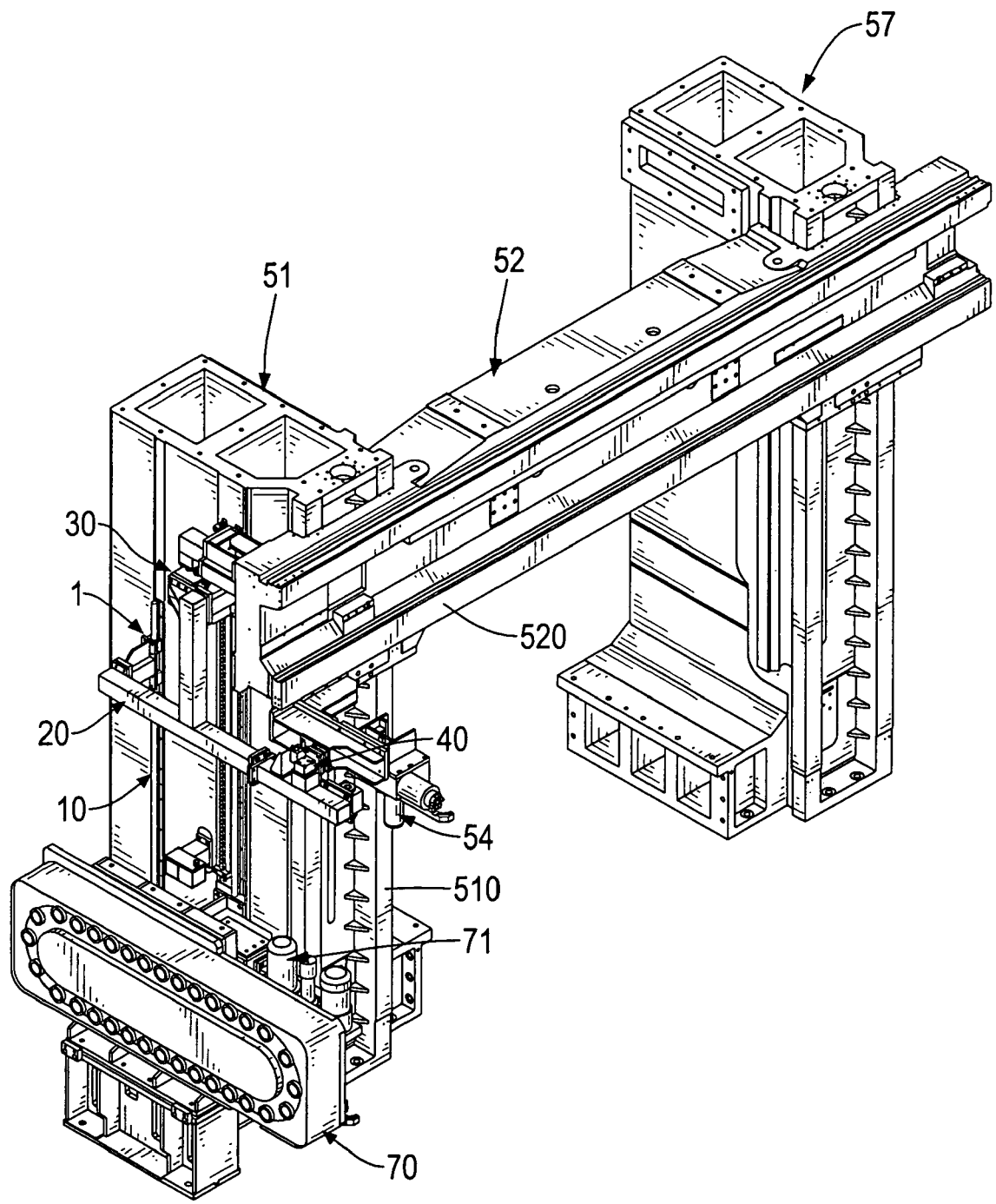
FIG. 1 is a perspective view of a machining center with a relay tool exchange device in accordance with the present invention.
Figure 2:
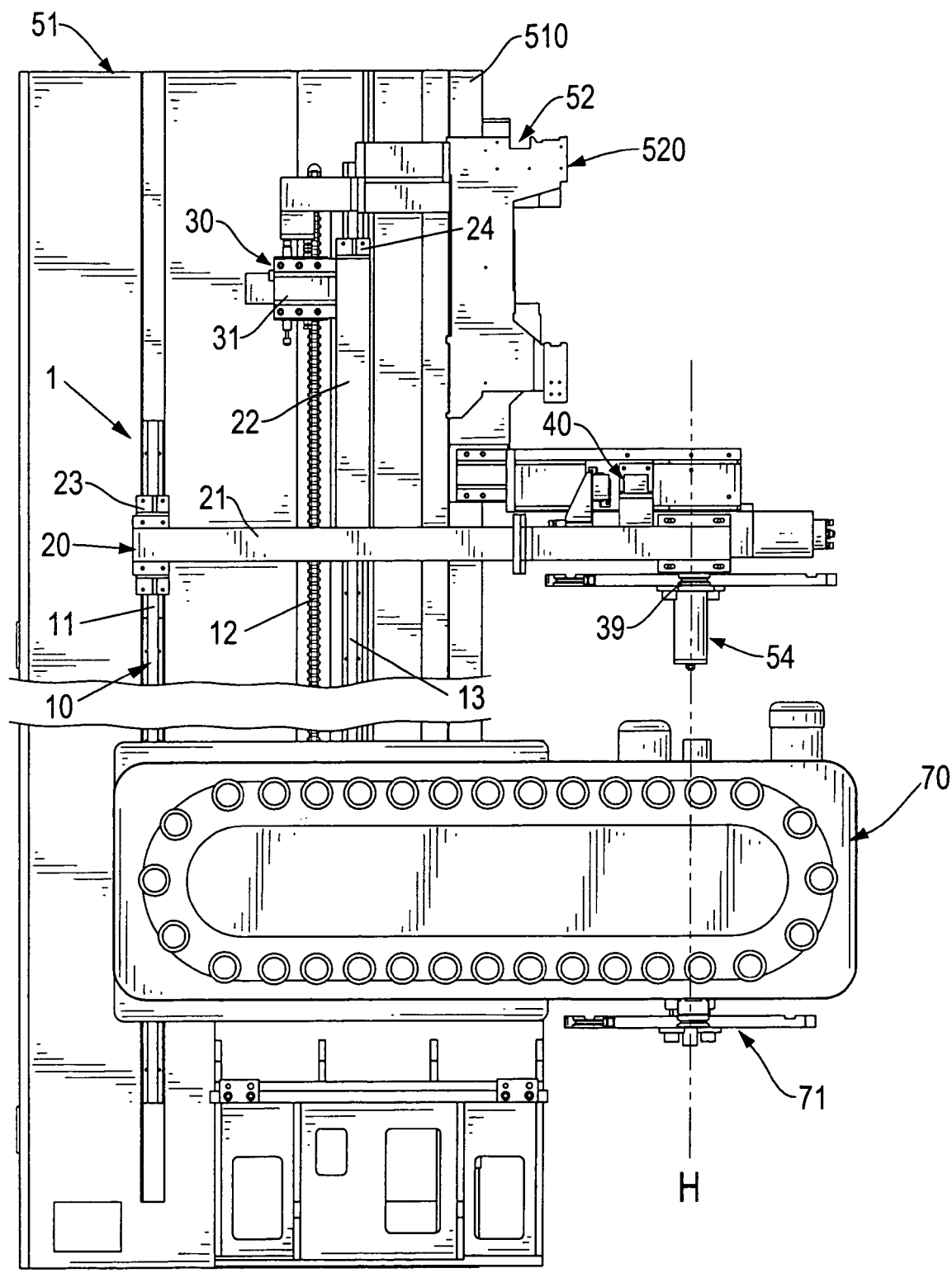
FIG. 2 is a side view of the machining center in FIG. 1.
Figure 3:
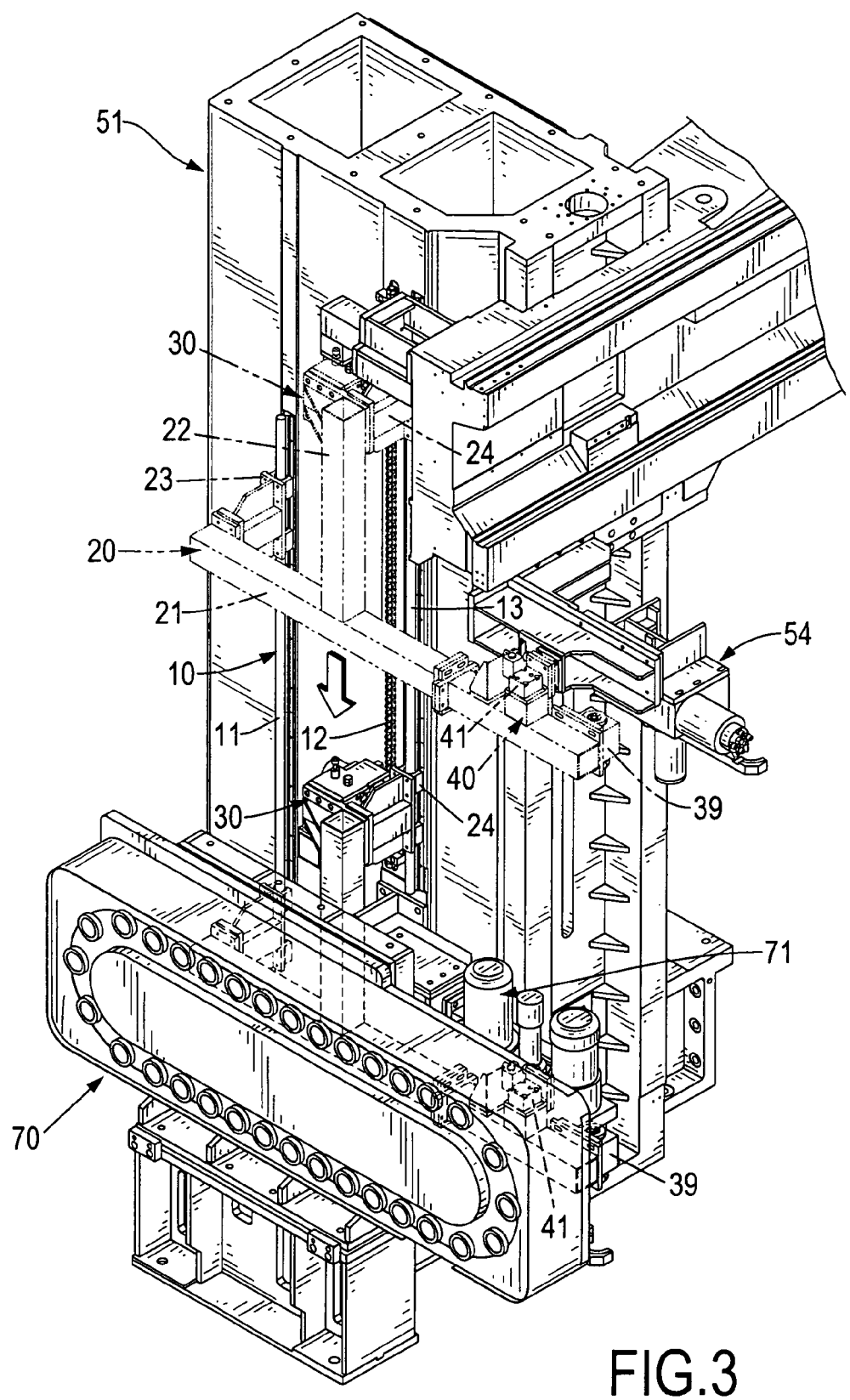
FIG. 3 is an operational perspective view of machining center in FIG. 1 with the relay tool exchange device moving down.
Figure 6:
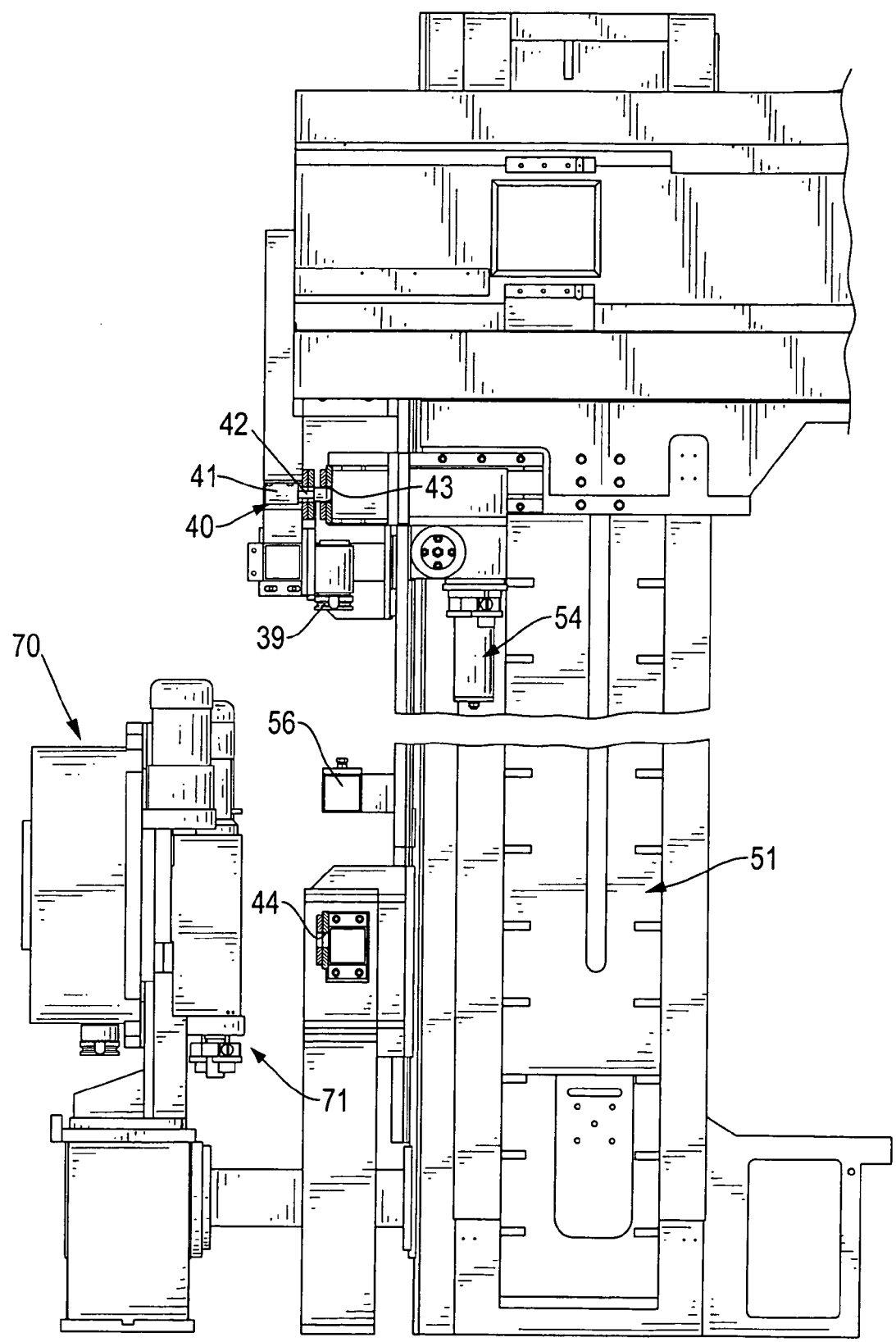
FIG. 6 is a front view of the machining center in FIG. 1.

With reference to FIGS. 1, 2 and 6, a machining center in accordance with the present invention comprises a first column (51), a second column (57), a crossbeam (52), a spindle, a tool magazine (70), an upper tool exchange device (54), a lower tool exchange device (71) and a relay tool exchange device (1). The first column (51) extends in a longitudinal direction relative to the ground or the floor and has a longitudinal side surface, a transverse side surface, a stop block (56), a lower inserting hole (44) and a longitudinal slide rail (510). The stop block (56) is formed on the transverse side surface of the first column (51). The lower inserting hole (44) is defined transversely in the transverse side surface of the first column (51) near the stop block (56) of the first column (51). The longitudinal slide rail (510) is formed longitudinally on the longitudinal side surface of the first column (51). The second column (57) extends longitudinally, is spaced transversely from the first column (51) and has a longitudinal side surface and a longitudinal slide rail formed longitudinally on the longitudinal side surface of the second column (57).

Figure 4:
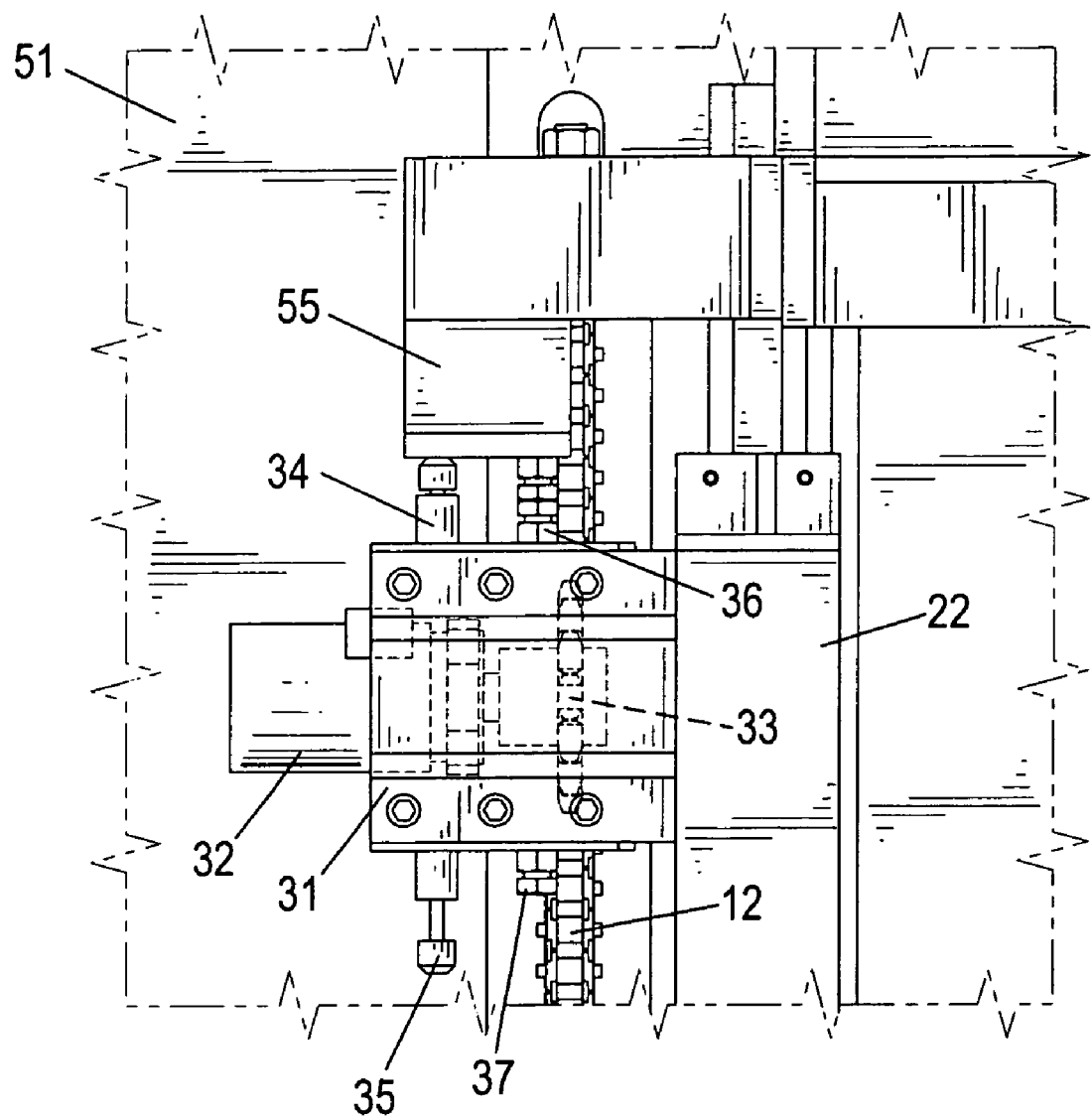
FIG. 4 is an enlarged front view of the driving device in FIG. 1.

With further reference to FIG. 4, the crossbeam (52) is mounted transversely on the first column (51) and the second column (57), is moveable along the longitudinal slide rails (510) of the first column (51) and the second column (57) and has a tool end near the first column (51), a longitudinal side surface, a transverse slide rail (520) and a stop block (55). The transverse slide rail (520) is formed on the longitudinal side surface of the crossbeam (52). The stop block (55) of the crossbeam (52) is formed on the tool end of the crossbeam (52) and is aligned with the stop block (56) on the first column (51).

The spindle is mounted on the crossbeam (52), is moveable transversely along the transverse slide rail (520) of the crossbeam (52) and has a spindle head and a machining tool. The machining tool is mounted detachably on the spindle head.

The tool magazine (70) is mounted near the first column (51) and the tool end of the crossbeam (52), has an inner transverse side surface and extends transversely to allow the tool magazine (70) to receive more tools in different types. The inner transverse side surface of the tool magazine (70) faces the transverse side surface of the first column (51). The tools received in the tool magazine (70) are moved in a predetermined closed trajectory having two longitudinal straight segments and two semi-circular segments.

Figure 5:
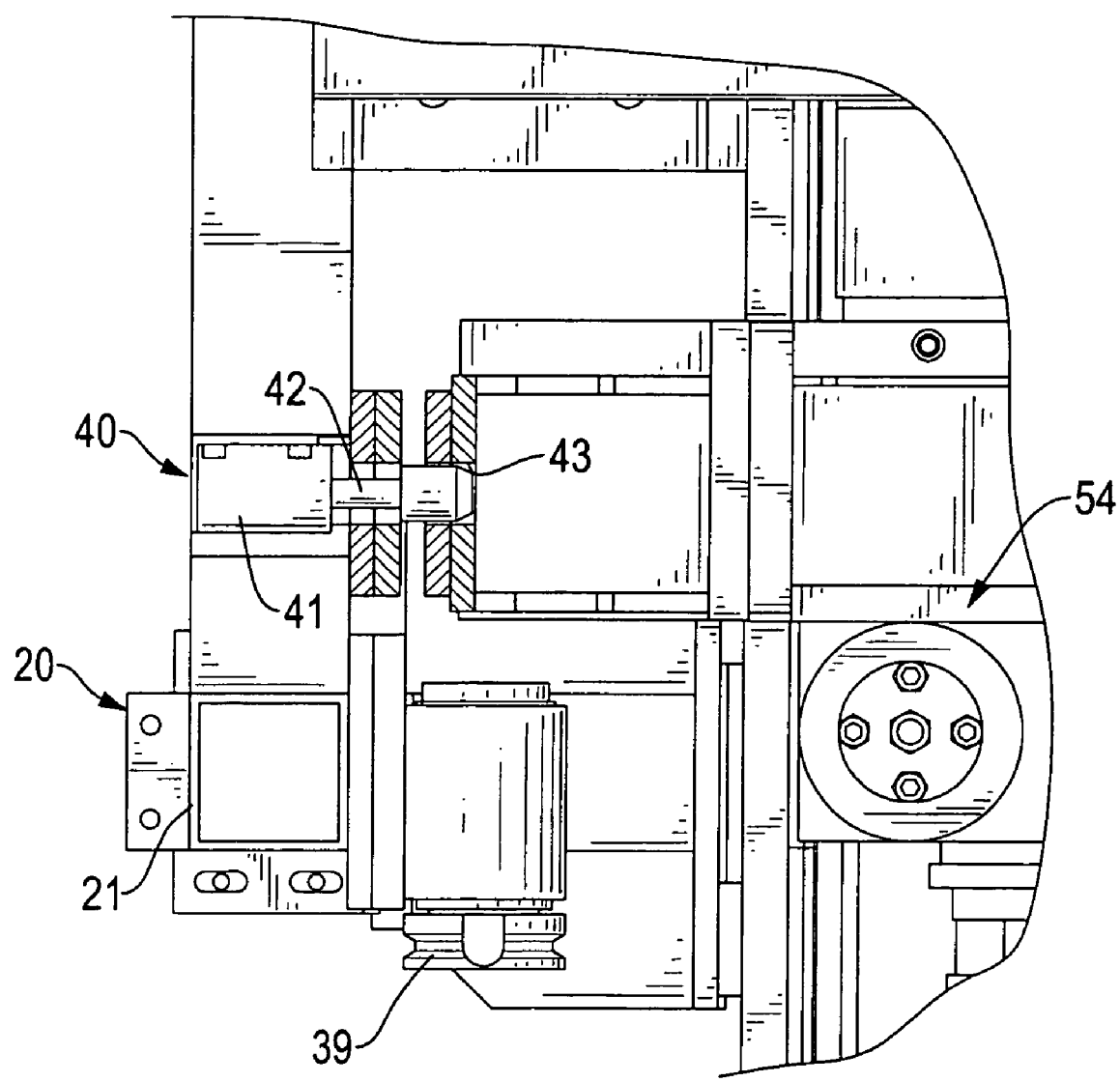
FIG. 5 is an enlarged front view in partial section of the positioning device with the inserting shaft inserting into the upper inserting hole in the upper tool exchange device.

With further reference to FIG. 5, the upper tool exchange device (54) is mounted on the tool end of the crossbeam (52) and has an upper inserting hole (43). The upper inserting hole (43) is defined transversely and is aligned longitudinally with the lower inserting hole (44) of the first column (51).

The lower tool exchange device (71) is mounted on the inner transverse side surface of the tool magazine (70) to grip tools in the tool magazine (70). The lower tool exchange device (71) and the upper tool exchange device (54) are located on a virtual plane (H) parallel to the longitudinal side surface of the first column.

With reference to FIGS. 2, 3, 7, 8 and 9, the relay tool exchange device (1) is mounted on the transverse side surface of the first column (51) and comprises a guide device (10), a frame (20), a tool case (39, 39a), a driving device (30, 30a, 30b) and a positioning device (40). The guide device (10) is mounted on the transverse side surface of the first column (51), extends longitudinally and comprises two guide rails (11, 13) and may comprises a chain (12). The guide rails (11, 13) are mounted separately and longitudinally on the transverse side face of the first column (51). The chain (12) is mounted on the transverse side face of first column (51) between the guide rails (11, 13).

With further reference to FIGS. 4, 5 and 6, the frame (20) is inverse T-shaped, is mounted moveably on the guide rails (11, 13) of the guide device (10) and has a lateral rod (21) and a longitudinal rod (22), two sliders (23, 24) and a fastening base (31) and may have a screw nut (25) having an inner thread. The lateral rod (21) extends transversely and has a slider end and a case end. The longitudinal rod (22) extends longitudinally and has an upper end and a lower end connected to the lateral rod (21). The sliders (23, 24) are connected respectively to the slider end of the lateral rod (21) and the upper end of the longitudinal rod (22), correspond to and are mounted moveably and respectively on the guide rails (11, 13).

The fastening base (31) of the frame (20) is mounted on the upper end of the vertical rod (22), is aligned longitudinally with the stop blocks (55) (56) of the crossbeam (52) and the first column (51), has a top surface and a bottom surface and may have a top stop rod (36), a top bumper (34), a bottom stop rod (37), a bottom bumper (35) or two stop switches (34a). The top stop rod (36) is mounted on the top surface of the fastening base (31) and has a top end. The top bumper (34) is mounted on the top surface of the fastening base (31) and has a top end. Before the bumper (34) being compressed, the top end of the top bumper (34) is more protrudent relative to the top surface of the fastening base (31) than the top end of the top stop rod (36). When the frame (20) moves upward, the top bumper (34) bumps with the stop block (55) on the crossbeam (52) to reduce impact force and then the top stop rod (36) abuts against the stop block (55) of the crossbeam (52) to stop and position the frame (20). The bottom stop rod (37) is mounted on the bottom surface of the fastening base (31) and has a bottom end. The bottom bumper (35) is mounted on the bottom surface of the fastening base (31) and has a bottom end. Before the bottom bumper (35) being compressed, the bottom end of the bottom bumper (35) is more protrudent relative to the bottom surface of the fastening base (31) than the bottom end of the bottom stop rod (37). When the frame moves downward, the bottom bumper (35) bumps with the stop block (56) on the first column (51) to reduce impact force and then the bottom stop rod (37) abuts against the stop block of the first column (51) to stop and position the frame (20). The stop switches (34a) are mounted respectively on the top and bottom surfaces of the fastening base (31) and may be contact switches, magnetic switches or infrared sensors et al.

Figure 7:
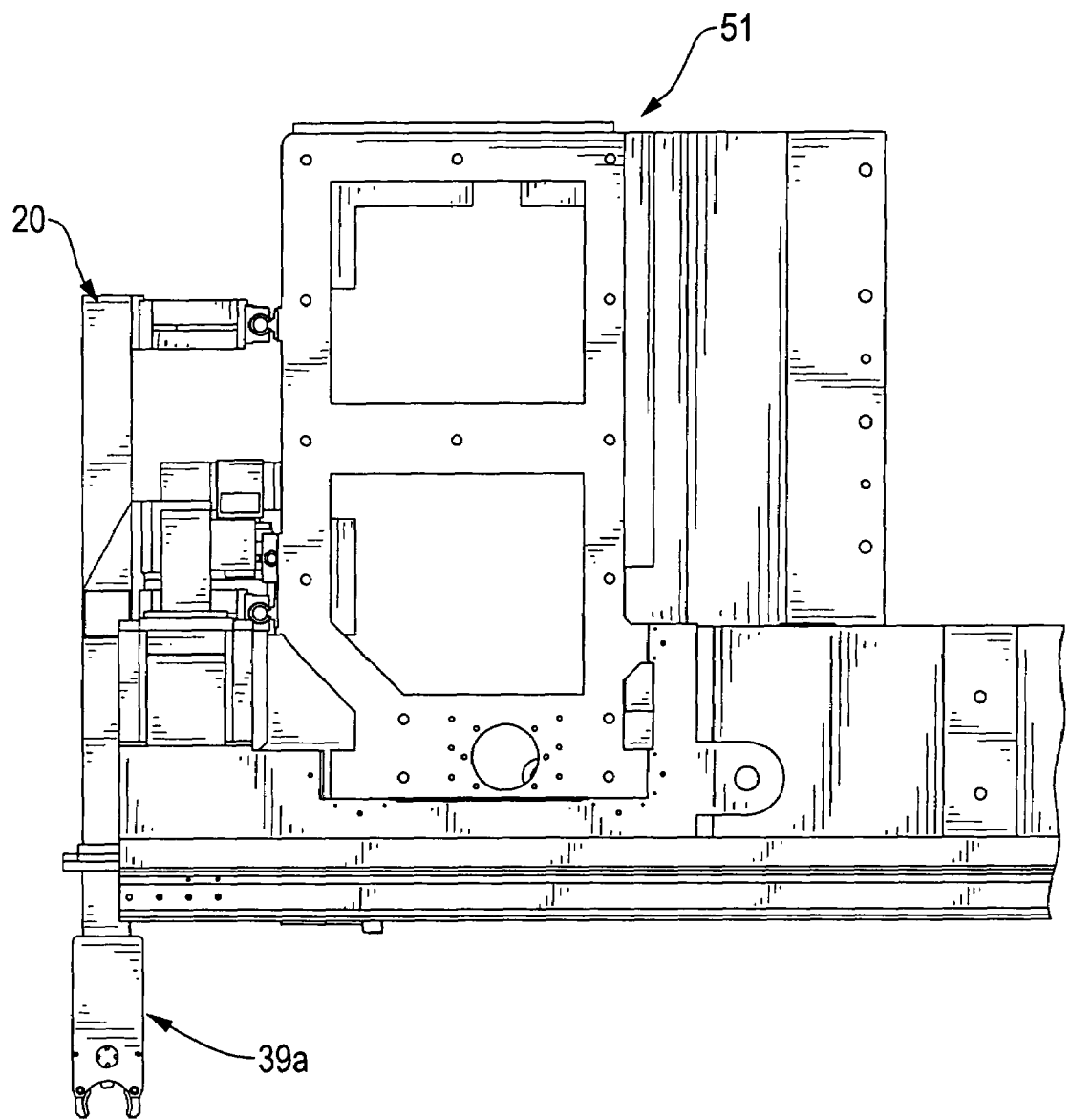
FIG. 7 is an enlarged top view of the machining center with the tool case having the gripper.

With further reference to FIG. 7, the tool case (39, 39a) is mounted on the case end of the longitudinal rod (21) of the frame (20), is aligned selectively with the upper and the lower tool exchange devices (54) (71) and may have a sleeve or a gripper. The sleeve has a downward opening to hold a tool. The gripper has a transverse opening to hold a tool.

Figure 8:
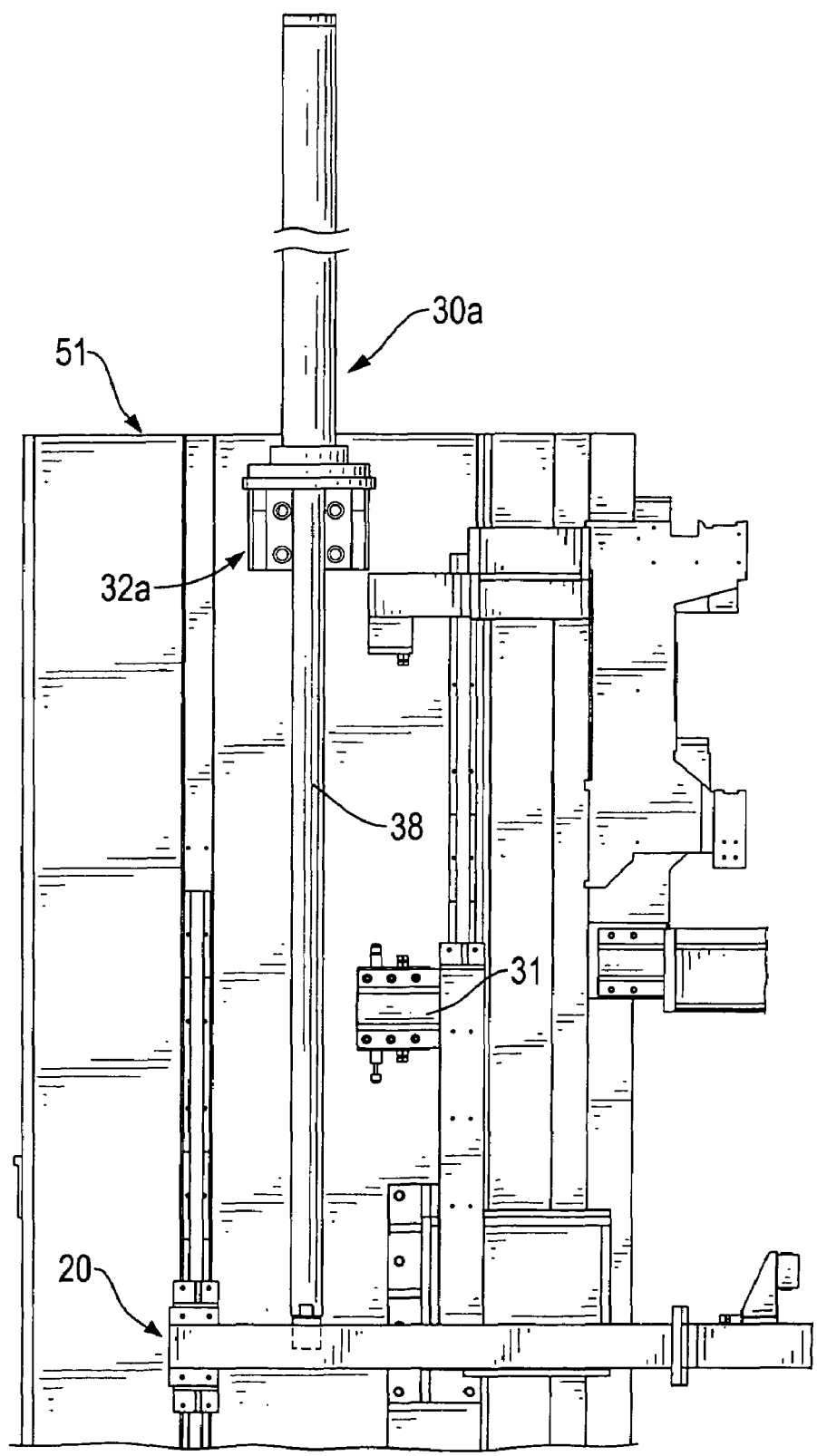
FIG. 8 is an enlarged side view of the machining center with the driving device having the hydraulic cylinder.
Figure 9:
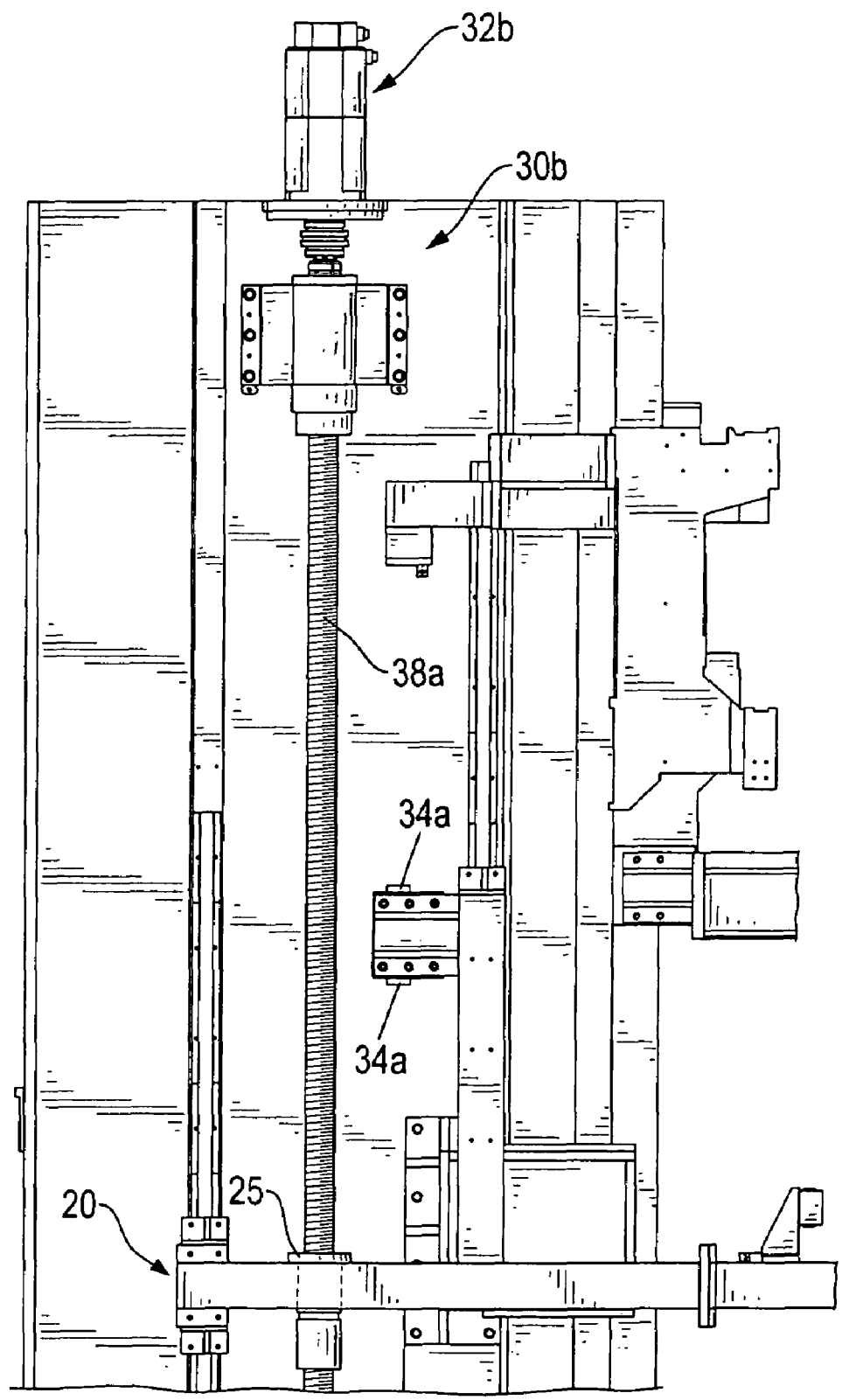
FIG. 9 is an enlarged side view of the machining center with the driving device having the servo motor.
Figure 10:
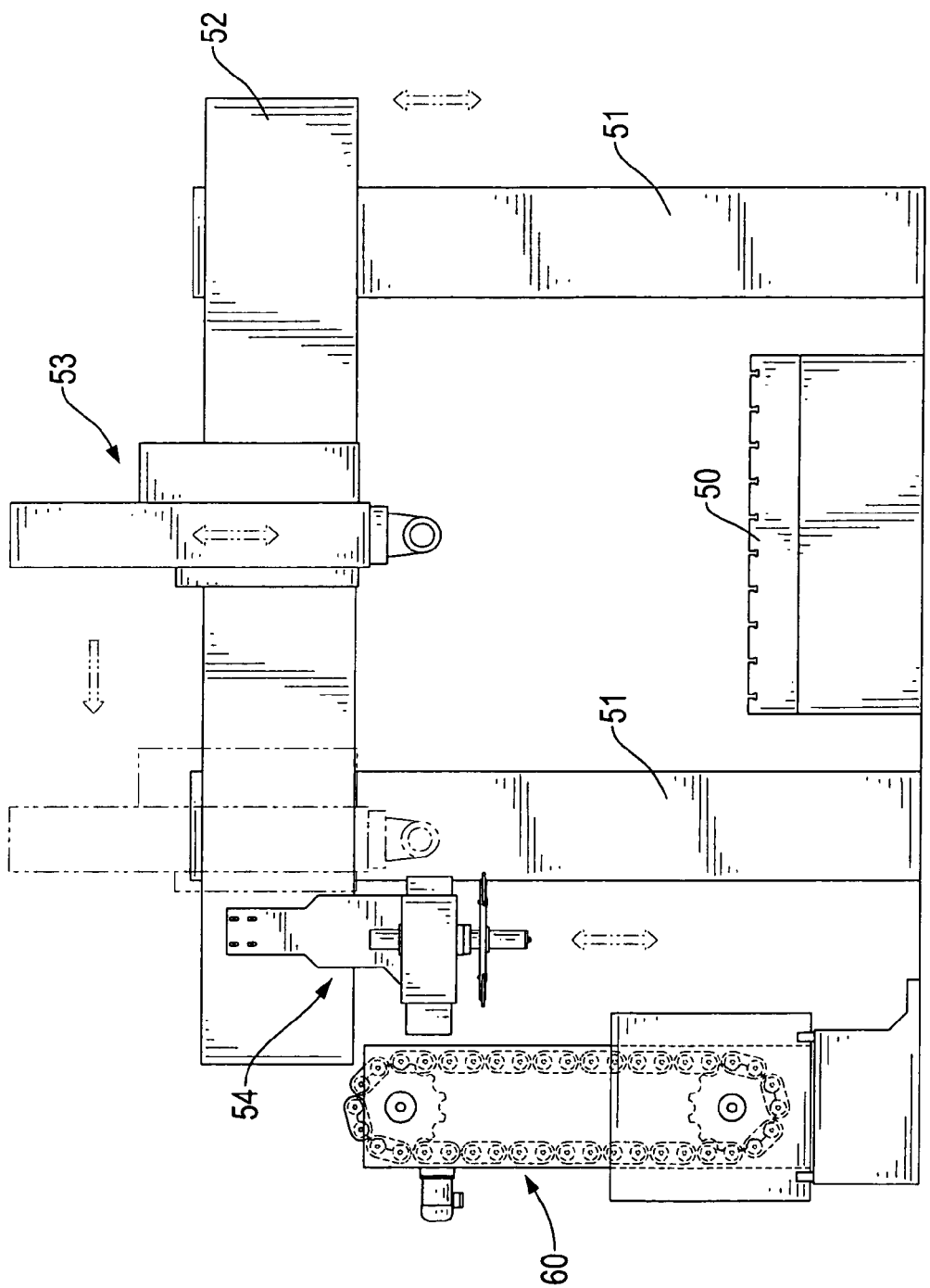
FIG. 10 is a schematic diagram of a conventional machining center in accordance with the prior art.

With further reference to FIGS. 8 and 9, the driving device (30, 30a, 30b) is connected to the frame (20), drives the frame (20) to move upward and downward to approach the upper and the lower tool exchange devices (54) (71) and may has a hydraulic motor (32), a hydraulic cylinder (32a) or a servo motor (32b). The hydraulic motor (32) is mounted on the fastening base (31) and has a motor shaft and a chain wheel (33). The chain wheel (33) is mounted on the motor shaft and engages the chain (12) of the guide device (10). When the hydraulic motor (32) rotates the chain wheel (33), the hydraulic motor (32) and the frame (20) move longitudinally along the chain (12). When the driving device (30a) has a hydraulic cylinder (32a), the hydraulic cylinder (32a) is mounted on the transverse side surface of the first column (51), has a cylinder shaft (38) connected to the frame (20) and drives the frame (20) to move up and down. When the driving device (30b) has a servo motor (32b), the servo motor (32b) is mounted on the transverse side surface of the first column (51) and has a power output member. The power output member is connected to the frame in a threaded manner and may be a lead screw (38a). The lead screw (39) corresponds to and is screwed into the screw nut (25) of the frame (20) to drive the frame (20) to move up and down. When the frame (20) moves up and down and approaches the stop blocks (55) (56) of the crossbeam (52) and the first column (51), the stop switches (34a) of the fastening base (31) are activated and stop the servo motor (32a) to position the frame (20).

The positioning device (40) is mounted on the frame (20) near the tool case (39, 39a) and comprises a positioning hydraulic cylinder (41) and an inserting shaft (42). The positioning hydraulic cylinder (41) is mounted on the lateral rod (21) of the frame (20). The inserting shaft (42) is driven by the positioning hydraulic cylinder (41) to stretch out and draw back. When the frame (20) moves up and is stopped by the stop block (55) of the crossbeam (52), the inserting shaft (42) stretches out and inserts into the upper inserting hole (43) of the upper tool exchange device (54) to precisely position the frame (20) and the tool case (39, 39a). When the frame (20) moves downward and is stopped by the stop block (56) of the first column (51), the inserting shaft (42) stretches out and inserts into the lower inserting hole (44) of the first column (51) to precisely position the frame (20) and the tool case (39, 39a). After the tool case (39, 39a) is precisely positioned, the tool case (39, 39a) grips and changes tools on the upper or lower tool exchange devices (54) (71).

The operation processes of the machining center are described as following to further explain how the machining center works:

1. When a machining tool used in a previous machining process is detached from the spindle (53) and is gripped by the tool case (39, 39a) of the relay tool exchange device (1):

A. The inserting shaft (42) of the positioning device (40) is driven to draw back form the upper inserting hole (43) of the upper tool exchange device (54) and the hydraulic motor (32) rotates the chain wheel (33) to move the frame (20) downward along the chain (12). After the frame (20) is stopped by the stop block (56) of the first column (51), the inserting shaft (42) of the positioning device (40) is driven to stretch out to insert into the lower inserting hole (44) of the first column (51) and precisely position the frame (20) and the tool case (39, 39a).

B. The lower tool exchange device (71) rotates 90 degrees to grip the machining tool on the tool case (39, 39a) and a tool for a next process and stored in the tool magazine (70). Then the lower tool exchange device (71) moves downward to detach the tools respectively from the tool case (39, 39a) and the tool magazine (70), rotates 180 degrees and moves up to mount the machining tool in the tool magazine (71) and the next tool on the tool case (39, 39a). After the tools are changed, the lower tool exchange device (71) rotates 90 degrees to reposition.

C. The inserting shaft (42) of the positioning device (40) is driven to draw back form the lower inserting hole (44) of the first column (51) and the hydraulic motor (32) rotates the chain wheel (12) to move the frame (20) upward along the chain (12). After the frame (20) is stopped by the stop block (55) of the crossbeam, the inserting shaft (42) of the positioning device (40) is driven to stretch out to insert into the upper inserting hole (43) of the upper tool exchange device (54) and precisely position the frame (20) and the tool case (39, 39a). The tool case (39, 39a) is disposed near the upper tool exchange device (54).

2. When a machining process is completed and the machining tool on the spindle is detached:

The spindle (53) moves toward the tool end of the crossbeam (52) and the upper tool exchange device (54) rotates 90 degrees to grip the machining tool of the spindle (53) and a next tool on the tool case (39, 39a). Then the upper tool 8 exchange device (54) moves downward to detach the tools respectively from the spindle (53) and the tool case (39, 39a), rotates 180 degrees and moves up to mount the next tool on the spindle (53) and the machining tool on the tool case (39, 39a). After the tools are changed, the upper tool exchange device (54) rotates 90 degrees to reposition and the relay tool exchange device (1) and moves downward to change tools as described before.

The machining center as described has the following advantages. The relay tool exchange device (1) moves up and down to change tools between the upper and lower tool exchange devices (54) (71). To move the crossbeam (52) up and down is unnecessary for changing tools, so manufacturing the machining center is easy and different sizes of workpieces can be machined by the machining center. In addition, when the relay tool exchange device (1) changes tools, a present machining process is not stopped and the machining efficiency is improved. Furthermore, the tool magazine (70) extends transversely and can receive more tools in different types to reduce time of manually changing tools in the tool magazine (70).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A machining center comprising
a first column extending longitudinally and having
a longitudinal side surface and a transverse side surface;
a second column extending longitudinally and spaced from the first column;
a crossbeam being mounted transversely on the first and the second columns and having a tool end near the first column;
a tool magazine being mounted near the first column, extending transversely and having an inner transverse side surface facing the transverse side surface of the first column;
an upper tool exchange device being mounted on the tool end of the crossbeam;
a lower tool exchange device being mounted on the inner transverse side surface of the tool magazine, wherein the lower tool exchange device and the upper tool exchange device are located on a virtual plane parallel to the longitudinal side surface of the first column; and
a relay tool exchange device being mounted on the transverse side surface of the first column and comprising
a guide device being mounted on the transverse side surface of the first column and extending longitudinally;
a frame being mounted moveably on the guide device;
a tool case being mounted on the frame and aligned selectively with the upper and the lower tool exchange devices; and a driving device being connected to the frame and driving the frame up and down to approach the upper and the lower tool exchange devices.

2. The machining center as claimed in claim 1, wherein the first column further has a stop block formed on the transverse side surface of the first column;
the crossbeam further has a stop block formed on the tool end of the crossbeam and aligned with the stop block of the first column; and
the frame has a fastening base aligned with the stop blocks of the crossbeam and the first column and having
a top surface;
a bottom surface;
a top stop rod being mounted on the top surface of the fastening base and having a top end,
a top bumper being mounted on the top surface of the fastening base and having a top end, wherein
before the top bumper being compressed, the top end of the top bumper is more protrudent relative to the top surface of the fastening base than the top end of the top stop rod; and
when the frame moves up, the top bumper bumps with the stop block of the crossbeam and the top stop rod abuts against the stop block of the crossbeam to position the frame;
a bottom stop rod being mounted on the bottom surface of the fastening base and having a bottom end, and
a bottom bumper being mounted on the bottom surface of the fastening base and having a bottom end, wherein
before the bottom bumper being compressed, the bottom end of the bottom bumper is more protrudent relative to the bottom surface of the fastening base than the bottom end of the bottom stop rod; and
when the frame is driven to move downward, the bottom bumper bumps with the stop block of the first column and the bottom stop rod abuts against the stop block of the first column to position the frame.

3. The machining center as claimed in claim 2, wherein the guide device comprises two guide rails mounted separately and longitudinally on the transverse side face of the first column; and
the frame further has two sliders connected to the frame, corresponding to and mounted moveably and respectively on the guide rails of the guide device.

4. The machining center as claimed in claim 3, wherein the guide device further comprises a chain; and
the driving device is a hydraulic motor mounted on the frame and having
a motor shaft; and
a chain wheel being mounted on the motor shaft and engaging the chain of the guide device.

5. The machining center as claimed in claim 4, wherein the first column further has a lower inserting hole defined transversely in the transverse side surface of the first column near the stop block of the first column;
the upper tool exchange device has an upper inserting hole defined transversely and aligned with the lower inserting hole of the first column; and
the relay tool exchange device further comprises a positioning device mounted on the frame near the tool case and having a positioning hydraulic cylinder and an inserting shaft driven by the positioning hydraulic cylinder, wherein
when the frame moves up and is stopped by the stop block of the crossbeam, the inserting shaft stretches out and inserts into the upper inserting hole of the upper tool exchange device; and
when the frame moves downward and is stopped by the stop block of the first column, the inserting shaft stretches out and inserts into the lower inserting hole of the first column.

6. The machining center as claimed in claim 5, wherein the frame is inverse T-shaped and has
a lateral rod being extending transversely and having a slider end and a case end, wherein the tool case is mounted on the case end; and
a vertical longitudinal rod extending longitudinally and having an upper end and a lower end connected to the lateral rod, wherein the fastening base and the driving device are mounted on the upper end of the vertical rod; and
the sliders are connected respectively to the slider end of the lateral rod and the upper end of the vertical rod.

7. The machining center as claimed in claim 6, wherein the tool case further has a sleeve.

8. The machining center as claimed in claim 6, wherein the tool case further has a gripper.

9. The machining center as claimed in claim 3, wherein the driving device is a hydraulic cylinder having a cylinder shaft connected to the frame.

10. The machining center as claimed in claim 1, wherein the first column further has a stop block formed on the transverse side surface of the first column;
the crossbeam further has a stop block formed on the tool end of the crossbeam and aligned with the stop block of the first column; and
the frame has a fastening base aligned with the stop blocks of the crossbeam and the first column and having
a top surface;
a bottom surface; and
two stop switches being mounted respectively on the top and bottom surfaces of the fastening base;
the driving device is a servo motor mounted on the transverse side surface of the first column and having a power output member connected to the frame in a threaded manner, wherein when the frame approaches the stop blocks of the crossbeam and the first column, the stop switches are activated and stop the servo motor.

11. The machining center as claimed in claim 10, wherein the frame further has a screw nut; and
the power output member is a lead screw corresponding to and screwed into the screw nut of the frame.

12. The machining center as claimed in claim 11, wherein the first column further has a lower inserting hole defined transversely in the transverse side surface of the first column near the stop block of the first column;
the upper tool exchange device has an upper inserting hole defined transversely and aligned with the lower inserting hole of the first column; and
the relay tool exchange device further comprises a positioning device mounted on the frame near the tool case and having a positioning hydraulic cylinder and an inserting shaft driven by the positioning hydraulic cylinder, wherein
when the frame moves up and is stopped by the stop block of the crossbeam, the inserting shaft stretches out and inserts into the upper inserting hole of the upper tool exchange device; and
when the frame moves downward and is stopped by the stop block of the first column, the inserting shaft stretches out and inserts into the lower inserting hole of the first column.

13. The machining center as claimed in claim 10, wherein
the first column further has a lower inserting hole defined transversely in the transverse side surface of the first column near the stop block of the first column;
the upper tool exchange device has an upper inserting hole defined transversely and aligned with the lower inserting hole of the first column; and
the relay tool exchange device further comprises a positioning device mounted on the frame near the tool case and having a positioning hydraulic cylinder and an inserting shaft driven by the positioning hydraulic cylinder, wherein when the frame moves up and is stopped by the stop block of the crossbeam, the inserting shaft stretches out and inserts into the upper inserting hole of the upper tool exchange device; and
when the frame moves downward and is stopped by the stop block of the first column, the inserting shaft stretches out and inserts into the lower inserting hole of the first column.

* * * * *